Aug. 7, 1945.  J. H. SHAPLEIGH  2,381,696
PRODUCTION OF HYDROGEN-NITROGEN MIXTURES
Filed Dec. 19, 1940
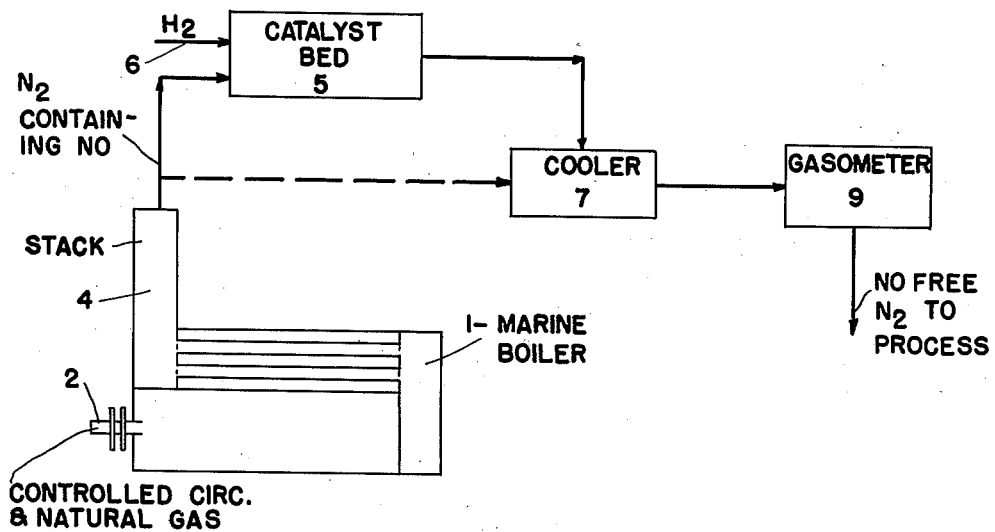
FIG.-1
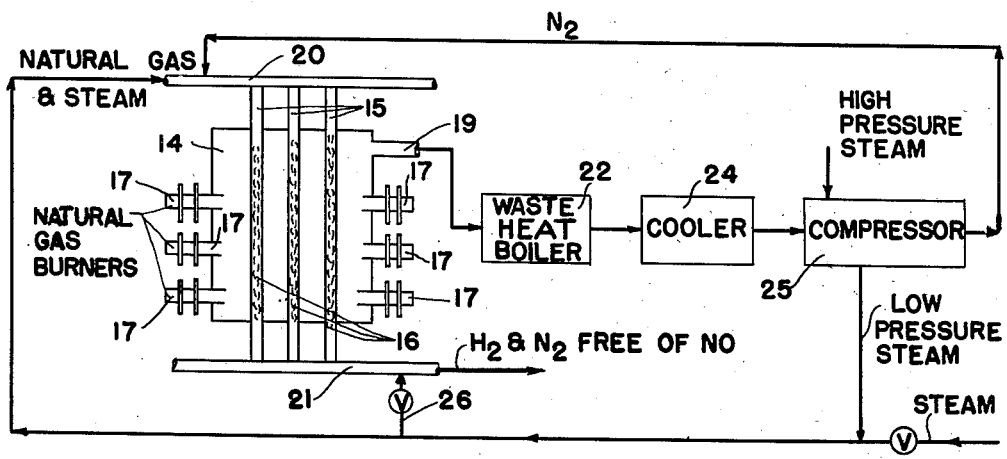
FIG.-3
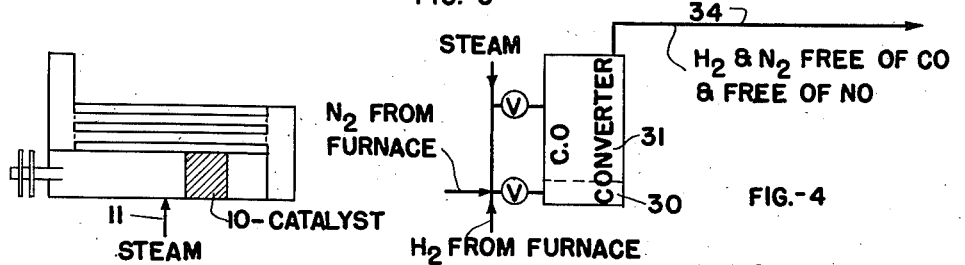
FIG.-2
FIG.-4
JAMES H. SHAPLEIGH
INVENTOR.
BY Cleveland B. Hallenbeck Patented Aug. 7, 1945

2,381,696

UNITED STATES PATENT OFFICE 2,381,696

PRODUCTION OF HYDROGEN-NITROGEN MIXTURES

James H. Shapleigh, Wilmington, Del., assignor to Hercules Powder Company, Wilmington, Del., a corporation of Delaware Application December 19, 1940, Serial No. 370,747

10 Claims. (Cl. 23—212)

This invention relates to the purification of gases and more particularly to the removal of nitrogen oxide from nitrogen containing gases. The invention specifically relates to the production of factor gases, which are substantially free of nitrogen oxide, for use in the synthetic production of ammonia.

In the production of synthetic ammonia, the art normally produces hydrogen and nitrogen by separate process but may produce these factor gases in one operation. In whatever manner the factor gases are produced, it is necessary to remove the various impurities such as carbon and sulfur compounds, for example, carbon monoxide, carbon dioxide, sulfur dioxide, and hydrogen sulfide. These known factor gas producing processes have been efficiently carried out and synthetic ammonia produced from the gas therefrom in acceptable yields.

During the process of producing and purifying factor gases and manufacturing ammonia therefrom, the art has experienced difficulties in operation due to corrosion of apparatus caused by small amounts of impurities in the factor gases. Specifically it has been found that if nitrogen oxide is present, even in very small quantities, it causes undue corrosion especially in compressors, pipe lines, valves and the like.

Removal of the nitrogen oxide has been previously accomplished by subjecting factor gases to liquefaction processes with or without washing the factor gases with liquid nitrogen but these processes are very expensive, as both investment and operative cost is high. The removal of nitrogen oxide by absorption in other liquid mediums has been considered but no efficient or satisfactory means has been developed.

It is the object of this invention to provide factor gases for use in ammonia synthesis which are substantially free from nitrogen oxide.

It is a further object of this invention to generate nitrogen substantially free from nitrogen oxide.

It is a further object of this invention to generate admixtures of gases containing nitrogen substantially free from nitrogen oxide.

It is a further object of this invention to generate a hydrogen-nitrogen admixture substantially free of nitrogen oxide.

It is a further object of this invention to provide a method of removing nitrogen oxide from nitrogen.

It is a further object of this invention to provide a means of removing nitrogen from admixtures of hydrogen and nitrogen.

It is a still further object of this invention to provide a means for the simultaneous production of an admixture of hydrogen and nitrogen which is substantially free of nitric oxide.

Other and further objects of this invention will become apparent upon an understanding of the description and drawing presented hereinafter.

In general, the objects of this invention have been accomplished by treating factor gases containing any amount, usually a minor amount, of undesirable nitrogen oxide with a volume of hydrogen, at least equal to the nitrogen oxide present and preferably in excess of that present. The treatment is conducted under temperature and pressure conditions and in the presence of a catalyst so that the hydrogen reduces the nitrogen oxide to nitrogen and water.

More specifically, I have found that factor gas may be treated at any one of a number of various stages in its production. In the manufacture of nitrogen, I may add to the nitrogen after, and/or during its production, by any suitable means, hydrogen sufficient to be equal in volume to or in excess of the volume of nitrogen oxide gas present and cause the admixture to pass over a suitable catalyst whereby reduction of the NO to $N_2$ and water is effected, or in particular I may pass nitrogen generated from combustion of hydrocarbon with air, for example, directly over a suitable catalyst and obtain a reduction of the NO present by reaction with the small quantity of hydrogen which was produced by the burning of the hydrocarbon gases. However, it has been found advantageous even in the latter case to add hydrogen to insure at least an equivalent amount thereof to the nitrogen oxide.

If, for example, factor gases for the catalysis of ammonia are to be produced, I find that I may remove the NO present in the nitrogen in accordance with the above described methods prior to admixture with the hydrogen necessary or that I may admix with the nitrogen the total necessary hydrogen for $NH_3$ catalysis and then pass this mixture through a catalyst suitable to effect reduction of the NO to nitrogen and water.

Having now indicated in general the nature and purpose of my invention, there follows a more detailed description of several prefered embodiments with reference to the accompanying drawing, in which:

Fig. 1 represents, diagrammatically, a flow sheet indicating the production of nitrogen from a nitrogen furnace and the removal therefrom of nitrogen oxide.

Fig. 2 represents a marine boiler for producing nitrogen in which a catalyst has been introduced to reduce substantially all nitrogen oxide.

Fig. 3 represents, diagrammatically, a flow sheet indicating the method of producing a mixture of nitrogen and hydrogen substantially free of nitrogen oxide.

Fig. 4 represents, diagrammatically, a carbon monoxide converter which is arranged to produce at its exit a hydrogen-nitrogen mixture suitable for use as factor gas in the synthetic production of ammonia.

Referring now to the figures and especially to Fig. 1, the present invention will be described as a means of producing nitrogen for use in ammonia synthesis.

In Fig. 1 is shown a marine boiler 1 which has a gas burner 2 in which natural gas may be burned with air in a manner that controls the combustion products so that nitrogen and carbon dioxide are the principal products. This burner 2 when closely controlled to produce a small concentration of CO will produce some quantities of hydrogen and nitrogen oxide or, when $O_2$ is present NO without $H_2$. The gaseous products leave the furnace 1 via the stack 4 and are passed through a catalyst bed 5 where the NO content is reduced by the hydrogen present or by that introduced to $N_2$ and water. If the hydrogen produced during the burning of the natural gas is not sufficient to equal the NO content entering the catalyst bed 5, the additional hydrogen is added at point 6 to supply the amount required to cause complete reduction of the NO. From the exit of catalyst bed 5, the nitrogen, free of NO, is passed if desired through a cooler 7 and to a gasometer 9 where it awaits use in ammonia synthesis.

I have found that it may be desirable in some instances to place the catalyst bed 5 within the marine boiler 1 in order to conserve equipment. For example, the catalyst bed may be located at point 10 (Fig. 2), in which case the conversion of the NO produced may be accomplished by the hydrogen which is present after burning of the natural gas or by excess hydrogen admitted to the furnace at point 11 which may be any point before or within the catalyst bed. The operation of a system in which the catalyst is within the marine boiler is efficient when the catalyst is placed in the back end of the fire box where the temperature is sufficiently high to maintain a rapid reduction of NO, for example, approximately 600° C. where $H_2$ may be economically admitted (without wasteful reaction with $O_2$). After producing NO free nitrogen by the method of Fig. 2, the gas is led from the stack 4 directly to cooler 7 and thence to the gasometer 9, see Fig. 1.

Although production of NO free nitrogen may be accomplished as described with reference to Figs. 1 and 2, I have found that for the preparation of factor gases for an ammonia synthesis system the preferable method comprises the simultaneous production of nitrogen and hydrogen and for this production the apparatus described in my U. S. Patent Reissue 21,521, is very desirable. Thus, the furnace described therein may be adapted for producing a factor gas mixture which is entirely suitable for ammonia synthesis and which is substantially free of nitrogen oxide. By reference to Fig. 3, this preferable method is seen to include a furnace 14 having extending therethrough a plurality of catalysis tubes 15 containing a catalyst 16. The furnace 14 is equipped with gas burners 17 located vertically along the side of the furnace. The furnace and tubes are heated by the gas burners 17 which may be regulated so as to produce a flue gas mixture, containing nitrogen, carbon dioxide, a small amount of nitrogen oxide and usually some $O_2$ (1% to 4%), that exits at point 19. The tubes 15 in the furnace are heated to a temperature which causes a mixture of natural gas and steam, introduced to header 20 and flowed through the tubes 15, to be converted or cracked into hydrogen, carbon monoxide and carbon dioxide by the catalyst 16. This mixture exits via header 21.

The flue gas mixture which exits at 19 may be directed through a waste heat boiler 22, a cooler 24, and then to a compressor 25 where it is placed under sufficient pressure to allow it to be injected into the header 20 along with the natural gas and steam and to pass in admixture therewith through the catalyst tubes 15 wherein upon the production of hydrogen there is obtained the reduction of the nitrogen oxide present. The gaseous mixture exits via header 21 as described above and comprises an admixture which is suitable for use in an ammonia synthesis operation. This introduction of the flue gas from the burners of the hydrogen furnace allows the simplification of the process of producing factor gases for an ammonia system.

In the above process, I have used high pressure steam to operate the compressor 25 and have further used the low pressure steam exiting from compressor 25 as a steam supply for the cracking tubes 15 of furnace 14 or I may use it to mix with and cool gases from 21 through pipe 26. This arrangement introduces an economy to the entire system. The steam for the compressor may be generated in the waste heat boiler 22.

This described process illustrated by reference to Fig. 3 is advantageous as the use of the nitrogen containing flue gas enables more excess steam to be used in the converter because that steam is higher in quantity, due in turn to the added cooling requirement which the nitrogen coming from the tubes introduces into the system. The tubes in reality represent a heater for the nitrogen, which allows high quality steam to be used to bring it down to the CO converter temperature, thereby causing greater excess steam which is desirable for the converter operation. While generating the hydrogen in the tubes, of course, the NO is reduced and thereby is produced the desired factor gas.

In most instances, it is desirable to convert the carbon monoxide present in the produced hydrogen to carbon dioxide before the hydrogen is used in a process, such as an ammonia synthesis and this may be accomplished by passing the hydrogen containing carbon monoxide with an added excess of steam through a CO converter containing a suitable catalyst. It is known that the steam must be added in substantial excess to obtain efficient conversion and that the temperature must be maintained at the optimum point usually about 350–400° C. It may happen that sufficient steam to lower the temperature is entirely too much to economically obtain efficient conversion of the CO and steam to $CO_2$ and hydrogen. After conversion, it is customary to add the nitrogen necessary to obtain the 3–1 mixture desired. I have now found that I may convert the CO to $CO_2$ at optimum temperatures and with an optimum amount of steam; convert the NO present in nitrogen to $N_2$ and $H_2O$ and obtain the desired 3–1 mixture at the same time. This efficient system is illustrated in Fig. 4 wherein a carbon monoxide converter 30 containing a suitable catalyst 31 is supplied at entrance 32 with sufficient steam to provide a conversion of the CO and $H_2O$ to $CO_2$ and $H_2$ when it passes catalyst 31. The conversion is fairly efficient but due to the control of the steam added and temperature of reaction it may be difficult to obtain an exit gas at 34 which has the most desired composition. To this known method of operation, I introduce nitrogen gas ahead of the catalyst, or within the catalyst zone at any desired temperature and thereby obtain more efficient control of the reaction. Further, I have found that in the presence of the hydrogen and the catalyst, substantially all NO present is reduced to nitrogen and water. In the above discussed process, illustrated by Fig. 4, it will be understood that the $H_2$ and/or the nitrogen may be obtained from any desired source, although I find that production of the $H_2$ by the furnace described in my U. S. Patent Reissue 21,521 and production of the $N_2$ by burning natural gas in a marine boiler are satisfactory sources.

The above described methods of producing factor gases for use in an ammonia synthesis system have been presented to illustrate the application of my improved and novel means of removing NO from nitrogen containing gases. The removal of the NO from nitrogen containing gases is essential to the operation of any system in which the nitrogen must be compressed and/or used in apparatus which is subject to corrosion. The corrosion problem is especially difficult to control in ammonia synthesis since high pressure compressors must be employed and the cylinders, pistons, and packings thereof if corroded even slightly, present serious operation difficulties. Further corrosion problems are encountered in the pipe lines through which the nitrogen is passed and especially in the valves controlling these pipe lines.

In the foregoing methods, the use of a catalyst to effect practical conversion has been pointed out as necessary. The catalyst which I have found suitable and preferable for effecting the reduction of the NO by $H_2$ by method of Fig. 3 is nickel supported upon diaspore. For the method described in Fig. 4, the preferable catalyst has been found to be iron oxide or chrome oxide—iron oxide mixture, such as are used in a CO converter. Other catalysts which are contemplated by this invention for the various alternative embodiments are nickel deposited upon supports, such as "Tabular Corundum," asbestos, pumice, alumina, or the like; oxides of metals of the iron group alone or admixed with aluminum oxide; chromium oxide and the like, but it will be understood that the catalyst will be selected which is most efficient in the particular operation, for instance use may be made of activated catalysts, those made with hydraulic cements, or catalysts of various forms, extruded, pelleted or bonded etc., or those which are pre-reduced.

In accordance with this invention and to illustrate in more particular, the method of producing nitrogen substantially free of nitrogen oxide, the following examples are given:

*Example I*

With reference to the diagram shown in Fig. 3, an admixture of nitrogen and hydrogen substantially free of NO was produced by leading the flue gases previously used to heat the cracking tubes of the hydrogen furnace down through the cracking tubes themselves. The process comprised starting with the flue gases issuing from the furnace, which upon analysis contained between 80 and 100 parts of nitrogen oxide per million parts of gas, and passing this gas through a compressor and returning it to the top of the catalyst tubes of the furnace. After admixing with the steam and natural gas which are to be converted within the tubes to hydrogen CO and $CO_2$, the entire admixture was then forced past the catalyst, in the tubes, at a space velocity of about 400 and with increasing temperature to about 1600° F. at the exit. The catalyst used was nickel supported upon diaspore. The exit gas upon analysis contained a total of less than 1 part of nitrogen oxide per million. This reduction of nitrogen oxide content prevents corrosion of the apparatus and provides for efficient operation of the ammonia synthesis.

*Example II*

With reference to the diagram in Fig. 4, an admixture of nitrogen and hydrogen substantially free of NO was produced in the following manner. Hydrogen gas produced by cracking hydrocarbon gas in a furnace such as is described in my U. S. Reissue #21,521, and nitrogen produced by burning hydrocarbon gas with air in a suitable furnace and therefore containing an undesirable high percentage of nitrogen oxide were admixed and passed over a suitable catalyst such as iron oxide containing chromium oxide. The hydrogen taken from the cracking furnace at approximately 850° C. was admixed with the nitrogen which was at approximately 350° C. and an excess of steam over that required for reaction at the entrance of a converter containing a bed of catalyst. The admixture was passed through the catalyst bed at a space velocity of 1500 and a temperature of 400° C. The admixture upon exit contained less than 2 parts per million nitrogen oxide and was suitable for immediate use.

In the above examples the space velocity has been coordinated with the temperature of operation and this is necessary to obtain the optimum condition of operation. I have found that when using marine boiler gases at a low temperature, say about 500° F., I must reduce the space velocity to between about 350 to 1500 but when a high temperature, say about 2000° F., is used a space velocity of between about 5000 to 6000 is possible. In particular, for example, if 1000° F. is used a space velocity between approximately 3500 and 4000 has been found most preferable.

It will be understood that the details and examples hereinbefore set forth are illustrative only and that the invention as broadly described and claimed is in no way limited thereby.

What I claim and desire to protect by Letters Patent is:

1. The method of producing factor gases free of nitrogen oxide and adaptable for the synthesis of ammonia, which comprises burning a hydrocarbon gas in the presence of air in a furnace provided with a plurality of catalysis tubes to produce a flue gas with an oxygen content of not more than about 4%, and containing substantially more than one part per million of nitrogen oxide, cooling and removing from the flue gas substantially all the sensible heat corresponding to that above the temperature at which a mixture of a hydrocarbon gas reacts with steam to yield a substantial proportion of hydrogen, admixing the cooled flue gas with a preformed gaseous mixture of a hydrocarbon gas and steam to produce a gaseous admixture of hydrocarbon gas, steam, and said cooled flue gas, passing the gaseous admixture through a catalyst mass containing nickel as an essential constituent, the catalyst mass being positioned in the catalysis tubes in said furnace and the said tubes substantially uniformly heated externally whereby the catalyst mass is maintained with an increasing temperature to about 1600° F. near the exit thereof, and withdrawing therefrom a gaseous mixture containing hydrogen, nitrogen and oxides of carbon and free of nitrogen oxide.

2. The method of producing factor gases free of nitrogen oxide and adaptable for the synthesis of ammonia, which comprises burning a hydrocarbon gas in the presence of air in a furnace to produce a flue gas with an oxygen content of not more than 4% and containing substantially more than one part per million of nitrogen oxide, said furnace being provided with a catalysis tube which is heated externally by the heat of the burning, removing from the flue gas substantially all the sensible heat corresponding to that above the temperature at which a hydrocarbon gas reacts with steam to yield an appreciable proportion of hydrogen and thus cooling the flue gas, admixing the cooled flue gas with a preformed gaseous mixture of a hydrocarbon gas and steam to produce a gaseous admixture of hydrocarbon gas, steam, and said cooled flue gas, passing the gaseous admixture through a catalyst mass containing nickel as an essential constituent, the catalyst mass being positioned in the catalysis tube in said furnace and the said tube substantially uniformly heated externally whereby the catalyst mass is maintained with an increasing temperature to about 1600° F. near the exit thereof, and withdrawing therefrom a gaseous mixture containing hydrogen, nitrogen and oxides of carbon and free of nitrogen oxide.

3. The method of producing factor gases free of nitrogen oxide and adaptable for the synthesis of ammonia, which comprises subjecting a hydrocarbon gas to a normal combustion in the presence of air in a furnace to produce a flue gas low in oxygen content but rich in nitrogen and containing substantially more than about one part per million of nitrogen oxide, said furnace being provided with a catalysis tube which is heated externally by the heat of the burning, removing from the flue gas substantially all the sensible heat corresponding to that above the temperature at which a hydrocarbon gas reacts with steam to yield an appreciable proportion of hydrogen and thus cooling the flue gas, admixing the cooled flue gas with a preformed gaseous mixture of a hydrocarbon gas and steam to produce a gaseous admixture of hydrocarbon gas, steam, and said cooled flue gas, passing the gaseous admixture through a catalyst mass containing nickel as an essential constituent, the catalyst mass being positioned in the catalysis tube in said furnace and the said tube substantially uniformly heated externally whereby the catalyst mass is maintained with an increasing temperature to about 1600° F. near the exit thereof, and withdrawing therefrom a gaseous mixture containing hydrogen, nitrogen and oxides of carbon and free of nitrogen oxide.

4. The method of producing factor gases free of nitrogen oxide and adaptable for the synthesis of ammonia, which comprises subjecting a hydrocarbon gas to a normal combustion in the presence of air in a furnace to produce a flue gas low in oxygen content but rich in nitrogen and containing substantially more than about one part per million of nitrogen oxide, said furnace being provided with a catalysis tube which is substantially uniformly heated externally by the heat of the burning, removing from the flue gas substantially all the sensible heat corresponding to that above the temperature at which a hydrocarbon gas reacts with steam to yield an appreciable proportion of hydrogen and thus cooling the flue gas, admixing the cooled flue gas with a preformed gaseous mixture of a hydrocarbon gas and steam to produce a gaseous admixture of hydrocarbon gas, steam, and said cooled flue gas, passing the gaseous admixture through a catalyst mass comprising nickel as an essential catalytic constituent, said catalyst mass being positioned in said uniformly heated catalysis tube whereby said catalyst mass is maintained with an increasing temperature gradient to from about 1600° F. to about 2000° F. near the exit thereof, and withdrawing therefrom a gaseous mixture containing hydrogen, nitrogen and oxides of carbon and free of nitrogen oxide.

5. The method of producing factor gases free of nitrogen oxide and adaptable for the synthesis of ammonia, which comprises burning hydrocarbon gas in the presence of air in a furnace to produce a flue gas with an oxygen content of not more than about 4% and containing substantially more than one part per million of nitrogen oxide, said furnace being provided with a plurality of catalysis tubes which are substantially uniformly heated externally by the heat of the burning, removing from the flue gas substantially all the sensible heat corresponding to that above the temperature at which a hydrocarbon gas reacts with steam to yield an appreciable proportion of hydrogen and thus cooling the flue gas, admixing the cooled flue gas with a preformed gaseous mixture of a hydrocarbon gas and steam to produce a gaseous admixture of hydrocarbon gas, steam, and said cooled flue gas, passing the gaseous admixture through a catalyst mass comprising nickel as an essential catalytic constituent, said catalyst mass being positioned in said uniformly heated catalysis tubes whereby said catalyst mass is maintained with an increasing temperature gradient to from about 1600° F. to about 2000° F. near the exit thereof, and withdrawing therefrom a gaseous mixture containing hydrogen, nitrogen and oxides of carbon and free of nitrogen oxide.

6. The method of producing factor gases free of nitrogen oxide and adaptable for the synthesis of ammonia, which comprises subjecting a hydrocarbon gas to a normal combustion in the presence of air in a furnace to produce a flue gas with a low oxygen content and containing substantially more than one part per million of nitrogen oxide, cooling the flue gas by heat exchange in a steam boiler, admixing the cooled flue gas with a hydrocarbon gas and steam, passing the admixed gases through a hydrocarbon-steam-converting catalyst containing nickel as the essential catalytic constituent, the catalyst being contained in catalysis tubes in said furnace and said catalyst heated by the heat of the first combustion to a temperature upwards of from about 1600° F. to about 2000° F., whereby a gaseous admixture is produced comprising hydrogen, nitrogen, carbon monoxide and carbon dioxide, mixing the gaseous admixture with steam in excess of the amount required to convert all the carbon monoxide to carbon dioxide, passing this mixture in contact with a carbon monoxide conversion catalyst comprising iron oxide, at a temperature of from about 350° C. to about 400° C., and producing thereby a gaseous mixture rich in hydrogen and nitrogen and free of nitrogen oxide.

7. The method of producing factor gases free of nitrogen oxide and adaptable for the synthesis of ammonia, which comprises subjecting a hydrocarbon gas to a normal combustion in the presence of air in a furnace to produce a flue gas with a low oxygen content and containing substantially more than one part per million of nitrogen oxide, cooling the flue gas by heat exchange in a steam boiler, admixing the cooled flue gas with a hydrocarbon gas and steam, passing the admixed gases through a hydrocarbon-steam-converting catalyst containing nickel as the essential catalytic constituent, the catalyst being contained in a catalysis tube in said furnace and said catalyst maintained by the heat of the first combustion with an increasing temperature to about 1600° F. near the exit thereof, whereby a gaseous admixture is produced comprising hydrogen, nitrogen, carbon monoxide and carbon dioxide, mixing the gaseous admixture with steam in excess of the amount required to convert all the carbon monoxide to carbon dioxide, passing this mixture in contact with a carbon monoxide conversion catalyst comprising iron oxide, at a temperature of from about 350° C. to about 400° C., and producing thereby a gaseous mixture rich in hydrogen and nitrogen and free of nitrogen oxide.

8. The method of producing factor gases free of nitrogen oxide and adaptable for the synthesis of ammonia, which comprises subjecting a hydrocarbon gas to a normal combustion in the presence of air in a furnace to produce a flue gas low in oxygen content but rich in nitrogen and containing from about 80 to about 100 parts of nitrogen oxide per million parts of flue gas, said furnace being provided with a catalysis tube which is heated externally by the heat of the burning, removing from the flue gas substantially all the sensible heat corresponding to that above the temperature at which a hydrocarbon gas reacts with steam to yield an appreciable proportion of hydrogen and thus cooling the flue gas, admixing the cooled flue gas with a preformed gaseous mixture of a hydrocarbon gas and steam to produce a gaseous admixture of hydrocarbon gas, steam, and said cooled flue gas, passing the gaseous admixture through a catalyst mass containing nickel as an essential constituent, the catalyst mass being positioned in the catalysis tube in said furnace and the said tube substantially uniformly heated externally whereby the catalyst mass is maintained with an increasing temperature to about 1600° F. near the exit thereof, and withdrawing therefrom a gaseous mixture containing hydrogen, nitrogen and oxides of carbon and free of nitrogen oxide.

9. The method of producing factor gases free of nitrogen oxide and adaptable for the synthesis of ammonia, which comprises subjecting a hydrocarbon gas to a normal combustion in the presence of air to produce a flue gas low in oxygen content but rich in nitrogen and containing substantially more than one part of nitrogen oxide per million parts of flue gas, removing from the flue gas substantially all the sensible heat corresponding to that above the temperature at which a hydrocarbon gas reacts with steam to yield an appreciable proportion of hydrogen and thus cooling the flue gas, admixing the cooled flue gas with a hydrocarbon gas and steam to produce a gaseous admixture of hydrocarbon gas, steam, and said cooled flue gas, passing the gaseous admixture through a catalyst mass containing nickel as an essential constituent, the catalyst mass being positioned in a catalysis tube and said tube being heated substantially uniformly externally by means of hot combustion gases, whereby said catalyst mass is maintained with an increasing temperature gradient to about 1600° F. near the exit thereof, and withdrawing therefrom a gaseous mixture containing hydrogen, nitrogen and oxides of carbon and free of nitrogen oxide.

10. The method of producing factor gases free of nitrogen oxide and adaptable for the synthesis of ammonia, which comprises subjecting a hydrocarbon to a normal combustion in the presence of air to produce a flue gas low in oxygen content but rich in nitrogen and containing substantially more than one part of nitrogen oxide per million parts of flue gas, removing from the flue gas substantially all the sensible heat corresponding to that above the temperature at which a hydrocarbon gas reacts with steam to yield an appreciable proportion of hydrogen and thus cooling the flue gas, admixing the cooled flue gas with a hydrocarbon gas and steam to produce a gaseous admixture of hydrocarbon gas, steam, and said cooled flue gas, passing the gaseous admixture through a catalyst mass containing nickel as an essential constituent, the catalyst mass being positioned in a catalysis tube and said tube being heated substantially uniformly externally by means of hot combustion gases, whereby said catalyst mass is maintained with an increasing temperature gradient to about 1600° F. near the exit thereof, and withdrawing therefrom a gaseous mixture containing hydrogen, nitrogen and oxides of carbon and free of nitrogen oxide.

JAMES H. SHAPLEIGH.

CERTIFICATE OF CORRECTION.

Patent No. 2,381,696.                 August 7, 1945.

JAMES H. SHAPLEIGH.

It is hereby certified that error appears in the printed specification of the above numbered patent requiring correction as follows: Page 1, first column, line 54, after the word "nitrogen" insert --oxide--; and that the said Letters Patent should be read with this correction therein that the same may conform to the record of the case in the Patent Office.

Signed and sealed this 6th day of November, A. D. 1945.

Leslie Frazer (Seal)                 First Assistant Commissioner of Patents.